(12) United States Patent
Ferry et al.

(10) Patent No.: US 9,070,199 B2
(45) Date of Patent: Jun. 30, 2015

(54) SHARING A GRAPHICS-PROCESSING-UNIT DISPLAY PORT

(71) Applicant: Apple Inc., Cupertino, CA (US)

(72) Inventors: William O. Ferry, San Jose, CA (US); David J. Redman, Fremont, CA (US); Adrian T. Sheppard, Santa Clara, CA (US); Sreeraman Anantharaman, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 360 days.

(21) Appl. No.: 13/658,686

(22) Filed: Oct. 23, 2012

(65) Prior Publication Data

US 2014/0092107 A1    Apr. 3, 2014

Related U.S. Application Data

(60) Provisional application No. 61/708,847, filed on Oct. 2, 2012.

(51) Int. Cl.
    *G06F 3/14*     (2006.01)
    *G06T 1/20*     (2006.01)
    *G09G 5/00*     (2006.01)

(52) U.S. Cl.
    CPC ...... *G06T 1/20* (2013.01); *G09G 5/006* (2013.01); *G06F 3/1431* (2013.01)

(58) Field of Classification Search
    CPC ..... G06F 13/385; G06F 3/1431; G09G 5/006; G09G 2370/042
    USPC ................... 345/1.1, 3.1, 501, 520
    See application file for complete search history.

(56) References Cited

U.S. PATENT DOCUMENTS

| | | | | |
|---|---|---|---|---|
| 6,198,477 B1 * | 3/2001 | Kurtze et al. | | 715/201 |
| 7,334,054 B2 * | 2/2008 | Anderson | | 710/15 |
| 8,582,028 B2 * | 11/2013 | Zeng | | 348/383 |
| 8,799,537 B1 * | 8/2014 | Zhu et al. | | 710/54 |
| 2003/0212811 A1 * | 11/2003 | Thornton | | 709/231 |
| 2012/0062800 A1 * | 3/2012 | Sisto et al. | | 348/660 |
| 2013/0163474 A1 * | 6/2013 | Chandra et al. | | 370/256 |

\* cited by examiner

*Primary Examiner* — Joni Richer
(74) *Attorney, Agent, or Firm* — Park, Vaughan, Fleming & Dowler LLP; Steven E. Stupp

(57) ABSTRACT

An electronic device selectively couples a head with links in a graphics processing unit to a currently selected display port in a pair of display ports. During operation, control logic in the electronic device monitors a pair of configuration signals from the pair of display ports, where the pair of configuration signals correspond to physical connections to the pair of display ports. Then, the control logic determines a selection control signal based on the monitored pair of configuration signals, a policy setting and a default display port, where the selection control signal specifies the currently selected display port. Moreover, the control logic provides the selection control signal to a multiplexer in the electronic device. Next, the multiplexer selectively couples the head with the links in the graphics processing unit to the currently selected display port based on the selection control signal.

21 Claims, 4 Drawing Sheets

SHARING A GRAPHICS-PROCESSING-UNIT DISPLAY PORT

RELATED APPLICATION

This application hereby claims priority under 35 U.S.C. §119 to U.S. Provisional Application No. 61/708,847, entitled "Sharing a Graphics-Processing-Unit Display Port," by William O. Ferry, David J. Redman, Adrian T. Sheppard and Sreeraman Anantharaman filed 2 Oct. 2012.

BACKGROUND

1. Field

The described embodiments relate to techniques for sharing a graphics-processing-unit display port with two or more external display ports in an electronic device.

2. Related Art

Displays are a popular technique for providing information to users of electronic devices. As a consequence, displays having a variety of audio/video display formats have been developed. In order to provide flexibility to users, it can be advantageous for an electronic device to support multiple external displays having different audio/video display formats.

However, it can be difficult to scale the limited resources in electronic devices to support multiple external displays. One approach used in existing electronic devices involves using a single display port having pins that can support physical connections to external displays having different audio/video interface formats. In this way, the display port can physically connect a variety of external displays to input/output (I/O) connectors in an integrated circuit in an electronic device. For example, the display port may be electrically coupled to a single head in a graphics processing unit in the electronic device that provides audio and video signals to the display port.

Another approach used in existing electronic devices is to have multiple display ports in the electronic device, each of which is compatible with a particular audio/video interface format. In this case, the display ports may be electrically coupled to corresponding dedicated I/O connectors in the integrated circuit, such as different heads in the graphics processing unit. However, because there are often a limited number of heads in the graphics processing units, dedicated use of particular heads for corresponding display ports can constrain the number of display ports that can be supported.

SUMMARY

The described embodiments include an electronic device that includes a graphics processing unit having a head with links that communicate video signals, audio signals, data signals and a configuration signal corresponding to a physical connection to a currently selected display port. A multiplexer in the electronic device selectively couples the links in the head to the currently selected display port in a pair of display ports, which is specified by a selection control signal. This pair of display ports can be coupled to displays and communicate the video, the audio and a pair of configuration signals corresponding to physical connections to the pair of display ports. Note that the pair of configuration signals includes the configuration signal (i.e., the configuration signal is one of the pair of configuration signals). Moreover, control logic in the electronic device monitors the pair of configuration signals and provides the selection control signal to the multiplexer based on the monitored pair of configuration signals, a policy setting and a default display port.

Note that the multiplexer may break the selective coupling to a previously selected display port before making the selective coupling to the currently selected display port. For example, the control logic may provide an enable signal to the multiplexer, and the multiplexer may break the selective coupling to the previously selected display port before making the selective coupling to the currently selected display port based on the enable signal. This enable signal may have a programmable duration. More generally, when changing the selective coupling, the multiplexer may decouple the graphics processing unit from the pair of display ports for a time duration so that software executing on the electronic device detects a change in the configuration signal.

In some embodiments, the multiplexer includes an analog multiplexer. Moreover, the control logic may include a filter that filters transient signals in the pair of configuration signals.

Furthermore, the pair of configuration signals may include hot-plug detect signals associated with the pair of display ports, and a given hot-plug detect signal may be asserted when a display is physically connected to a given one of the pair of display ports.

Additionally, the policy setting may include first-come, first-serve servicing or priority-based servicing, and the default display port may include one of the pair of display ports. In general, the policy setting and the default display port may be specified by: a hardware component electrically coupled to the control logic; and/or software executing on the electronic device.

In some embodiments, the electronic device selectively couples the links in the head to the currently selected display port without using a software driver. Therefore, the selectively coupling of the links in the head to the currently selected display port may be compatible with different operating systems that can execute on the electronic device.

Note that the control logic may determine the selection control signal using combinatorial logic. As a consequence, the control logic may be other than a processor.

Moreover, the pair of display ports may include physical connectors, and a given display port may only include a predefined number of pins associated with a particular audio/video interface format.

Another embodiment provides a system that includes the functionality of the electronic device.

Another embodiment provides a method for selectively coupling the head with the links in the graphics processing unit to the currently selected display port in the pair of display ports, which may be performed by the electronic device. During operation, control logic in the electronic device monitors the pair of configuration signals from the pair of display ports, where the pair of configuration signals correspond to physical connections to the pair of display ports. Then, the control logic determines the selection control signal based on the monitored pair of configuration signals, the policy setting and the default display port, where the selection control signal specifies the currently selected display port in the pair of display ports. Moreover, the control logic provides the selection control signal to the multiplexer in the electronic device. Next, the multiplexer selectively couples the head with the links in the graphics processing unit to the currently selected display port based on the selection control signal.

Figure 1:
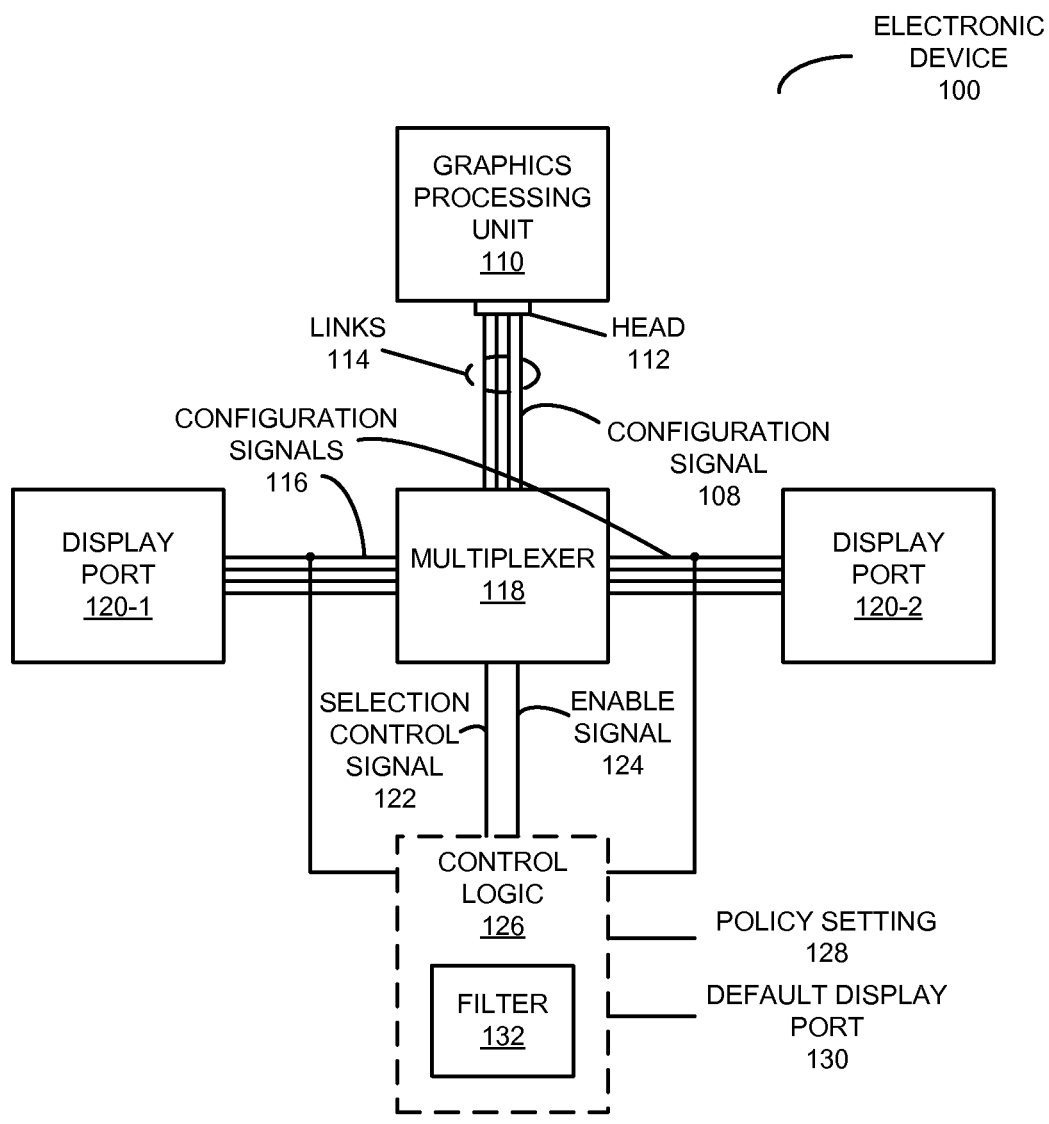
FIG. 1 is a block diagram illustrating an electronic device in accordance with an embodiment of the present disclosure.

Table 1 provides logic for determining a selection control signal in accordance with an embodiment of the present disclosure.

Table 2 provides logic for determining an enable signal in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

FIG. 1 presents a block diagram illustrating an electronic device 100, which includes a graphics processing unit 110 having a head 112 with links 114 that communicate high-speed video signals, audio signals, data signals and a configuration signal 108 corresponding to a physical connection to a currently selected display port. A multiplexer 118 in electronic device 100 selectively couples links 114 in head 112 to the currently selected display port in display ports 120, which is specified by a selection control signal 122. These display ports can be coupled to displays and communicate the video, the audio and a pair of configuration signals 116 corresponding to physical connections to display ports 120. Note that the pair of configuration signals 116 include configuration signal 108, and that, depending on the currently selected display port, configuration signal 108 can be either of configuration signals 116. Moreover, control logic 126 in electronic device 100 monitors the pair of configuration signals 116 and provides selection control signal 122 to multiplexer 118 based on the monitored pair of configuration signals 116, a policy setting 128 and a default display port 130.

Note that multiplexer 118 may break the selective coupling to a previously selected display port before making the selective coupling to the currently selected display port. For example, control logic 126 may provide an enable signal 124 to multiplexer 118, and multiplexer 118 may break the selective coupling to the previously selected display port before making the selective coupling to the currently selected display port based on enable signal 124. This enable signal may have a programmable duration. For example, enable signal 124 may have a 50 ms duration so that multiplexer 118 breaks the selective coupling to display ports 120 for 50 ms before making the selective coupling to the currently selected display port.

More generally, when changing the selective coupling, multiplexer 118 may decouple graphics processing unit 110 from display ports 120 for a time duration so that software executing on electronic device 100 detects a change in configuration signal 108. For example, by ensuring that graphics processing unit 110 is disconnected from display ports 120 for longer than a software reset time (such as 2 ms), the software may 'see' a 'full unplug' from the previously selected display port and, therefore, correctly transitions the audio and video signals provided by graphics processing unit 110 to those that are appropriate for the currently selected display port. In this way, the previously selected display port becomes invisible to the software and (subsequently) the currently selected display port becomes the display port that is serviced. Furthermore, the break before make may ensure that this multiplexing technique works even if the audio/video interface formats or protocols of the previously selected display port and the currently selected display port are different (see below).

Moreover, display ports 120 may include physical connectors, and a given display port may only include a predefined number of pins associated with a particular audio/video interface format. For example, each of display ports may include the minimum number of pins associated with a particular audio/video interface format. Therefore, in general, at least some of display ports 120 may support different audio/video interface formats, such as High-Definition Multimedia Interface or HDMI (and, more generally, an audio/video interface format compatible with the Consumer Electronics Association/Electronic Industry Alliance 861 standards) and Mini DisplayPort or mDP (from Apple Inc. of Cupertino, Calif.).

Furthermore, the pair of configuration signals 116 may include hot-plug detect (HPD) signals associated with the display ports 120, and a given hot-plug detect signal may be asserted when a display is physically connected to a given one of display ports 120.

Additionally, policy setting 128 may include first-come, first-serve servicing or priority-based servicing, and default display port 130 may include one of display ports 120. In general, policy setting 128 and default display port 130 may be specified by: a hardware component electrically coupled to control logic 126 (such as pin straps); and/or software executing on electronic device 100 (which is described further below with reference to FIG. 4). In this way, policy setting 128 and default display port 130 may be changed in real-time.

In some embodiments, electronic device 100 selectively couples links 114 in head 112 to the currently selected display port without using a software driver. Therefore, as described further below with reference to FIG. 4, the selectively coupling of links 114 in head 112 to the currently selected display port may be compatible with different operating systems that can execute on electronic device 100.

Note that control logic 126 may determine selection control signal 122 using combinatorial logic. As a consequence, control logic 126 may be other than a processor.

In some embodiments, multiplexer 118 includes an analog multiplexer. Moreover, control logic 126 may include a filter 132 that filters transient signals in the pair of configuration signals 116. For example, short transient signals (such as signals having a duration, or a corresponding fundamental frequency, which is less than 25 ms) may be used to communicate additional information other than physical connections to display ports 120 via HPD signals. By filtering out these transient signals, control logic 126 may be able to determine selection control signal 122.

By selectively coupling head 112 to the currently selected display port, electronic device 100 may be able to allow graphics processing unit 110 to service multiple display ports 120 (such as at least two different display ports) in a deterministic fashion without changing a user experience when hot plugging or unplugging external displays on to display ports 120. For example, a user may unplug a current external display from one of display ports 120 and plug in a new external display to the other of display ports 120 without turning off electronic device 100. In this way, electronic device 100 can be scaled to support more display ports in an efficient and cost-effective manner.

In an exemplary embodiment, the electronic device can simultaneously drive audio and video signals to a built-in monitor and at least two external displays. In particular, a processor may drive the built-in monitor and one of the heads in the graphics processing unit drives one of the display ports (such as an mDP display port). The other head in graphics processing unit drives one of two other display ports (such as one of an HDMI display port and an mDP display port) with the active (or currently selected) display port selected using additional display-multiplexing hardware, which provides mutual exclusivity between the HDMI display port and the mDP display port. (In addition, an application-specific integrated-circuit or ASIC controller may be used as a crossbar switch to direct outputs from the graphics processing unit to either of the mDP display ports.)

Figure 2:
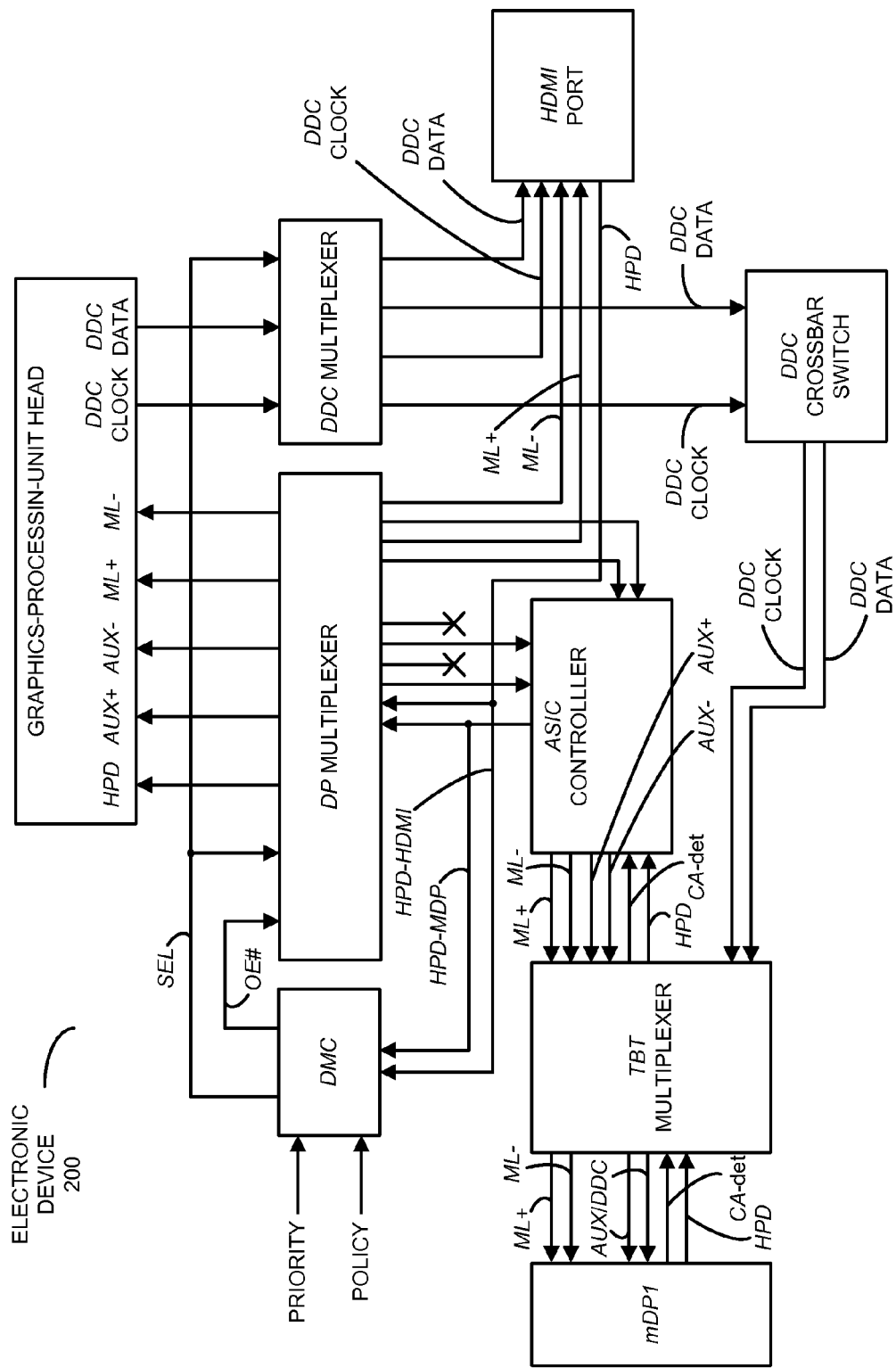
FIG. 2 is a block diagram illustrating an electronic device in accordance with an embodiment of the present disclosure.

The sharing on one of the graphics-processing-unit heads is shown in FIG. 2, which presents a block diagram illustrating an electronic device 200. Note that in electronic device 200 one or more multiplexers are used to selectively couple a head on a single graphics processing unit to one of two display ports, as opposed to multiplexing multiple graphics processing units to display ports.

In electronic device 200, a high-speed data-port (DP) multiplexer determines the routing of the main link (ML) and auxiliary channel (AUX CH) outputs from the graphics-processing-unit head. Moreover, a display data channel (DDC) multiplexer determines the routing of the sideband channel output. Furthermore, a display-multiplexer-controller (DMC) chip may be a configurable or component that provides a select value or SEL (and, more generally, the selection control signal 122 in FIG. 1) which determines which external display port receives the audio and video signals from the graphics-processing-unit head.

As shown in FIG. 2, a single graphics-processing-unit head or input/output (I/O) feeds two walk-up display ports. The policy for where to direct the output from the graphics-processing-unit head to the physical display ports may be implemented on the configurable DMC chip. By using the DMC chip to determine the select value, no additional firmware may be needed for either the DP multiplexer or the DDC multiplexer.

The DMC chip may use the hotplug-detect interrupts (HPD), a priority pin strap (i.e., default display port 130 in FIG. 1), and a policy pin strap (i.e., policy setting 128 in FIG. 1) to generate a select value that instructs the DP multiplexer and the DDC multiplexer whether to send their data (via the ASIC controller) to the HDMI display port or the mDP display port.

In FIG. 2, note that the DP multiplexer may direct data sent over the main link and auxiliary channel. If the output is the HDMI display port, then the DP multiplexer may only send the main link because HDMI does not use the auxiliary channel. Moreover, the DDC multiplexer may direct sideband data.

In addition to the aforementioned components, electronic device 200 may include: the ASIC controller that drives the mDP display ports; a DDC crossbar switch for the sideband; a Thunderbolt™ (a register trademark of Intel Corporation of Santa Clara, Calif.) or TBT multiplexer drives the corresponding mDP display port; mDP1 and mDP2 are the physical external display ports for TBT outputs; and an HDMI port drives the physical external display port for HDMI output.

When a single external display is connected over a display port to electronic device 200, the switching behavior determined by the DMC chip is simple: a signal drives that display. However, when a second external display is connected, there are two possible display-hotplug policy scenarios that can be implemented. In the first scenario, the display port that is connected first always has its display lit. (This approach introduces dependence on the order and selection of the mDP display port.) Alternatively, in the second scenario, the connected port with the highest priority (as determined by the priority or the policy) is always lit.

Note that the sharing of the display ports may impact the user experience. The first scenario described above resembles the existing behavior with dedicated heads for different display ports. In this case, after system sleep, the awakening process may cause a race condition that changes which displays are lit. Similar race conditions may happen in a variety of operating systems that can execute on electronic device 200.

Alternatively, in the second scenario, when a second external display is connected to the system, the DMC chip determines which display has the greater priority and then drives it. If required, the display multiplexers (i.e., the DP multiplexer and the DDC multiplexer) switch which display is driven. Moreover, the priority pin strap may determine the priority of each display port. If a display is connected to a display port with a higher priority, then the display that was already connected to a lower-priority display port may be turned off. As a consequence, the same display may be lit regardless of sleep and after-wake conditions, so that hotplug-race conditions may be irrelevant. The policy may be maintained for the variety of operating systems that can execute on electronic device 200.

We now describe how the DMC chip determines the outputs. The DMC chip may use four input signals, two HPD interrupt signals (HPD1 and HPD2) and two pin straps (priority and policy), to generate the OE#(enable signal 124 in FIG. 1) and SEL (selection control signal 122 in FIG. 1) outputs.

Note that the DMC chip is responsible for determining which display to select. The DMC chip may not directly process the HPD interrupt signals. In the DMC chip, an RC delay of 25 ms may be applied to the HPD1 and HPD2 inputs. This may ensure that any glitches (or transient signals) in the inputs having a time duration that is less than the RC delay are filtered out.

The SEL output may be determined as shown in Table 1. As described previously, the policy pin strap may be used to implement the chosen policy. To implement first-come, first-server servicing (i.e., the first display connected is the first one served) or policy 0, the policy pin strap may be set to logical '1', and the DMC chip may ignore the priority bit. (Note that in the SEL equation shown for policy 0, '+' denotes a logical OR operation and '·' denotes a logical AND operation.) Alternatively, for priority-based servicing or policy 1, the policy pin strap may be set to logical '0', and the DMC chip may use the priority pin strap value to determine the SEL signal.

| Pin strap | Condition | SEL |
| --- | --- | --- |
| Policy 0 | HPD1 and HPD2 order does not matter | SEL = $\overline{HPD1}$ + HPD2 · Priority |
| Policy 1 | Both HPD1 and HPD2 are set low | SEL = do not care; reset latch |
|  | HPD1 asserted before HPD2 | SEL = low (ex: 0 V) |
|  | HPD2 asserted before HPD1 | SEL = high (ex: 3.3 V) |

Table 1 provides logic for determining the selection control signal.

Table 1 provides logic for determining the selection control signal.

Furthermore, the OE# output may be determined as shown in Table 2. Note that OE# may be an active low signal.

|  | HPD1 low | HPD1 high |
|---|---|---|
| HPD2 low | OE# = high (ex: 3.3 V) | OE# = low (ex: 0 V) |
| HPD2 high | OE# = low (ex: 0 V) | OE# = low (ex: 0 V) |

Table 2 provides logic for determining an enable signal.

Table 2 provides logic for determining an enable signal.

Note that, if the SEL signal changes state, the OE# pin may be toggled. In order to make the graphics processing unit aware that the state of the SEL has changed, the DMC chip may de-assert and assert the OE# pin at the correct time to generate a synthetic unplug/hotplug by performing the following sequence of operations on the DP multiplexer. First, the DMC chip may drive the OE# pin to de-assert the HPD from the DP multiplexer to the graphics processing unit. Then, there may be a wait of 50 ms. Next, the DMC chip may drive the OE# pin to assert the HPD from the DP multiplexer to the graphics processing unit.

Figure 3:
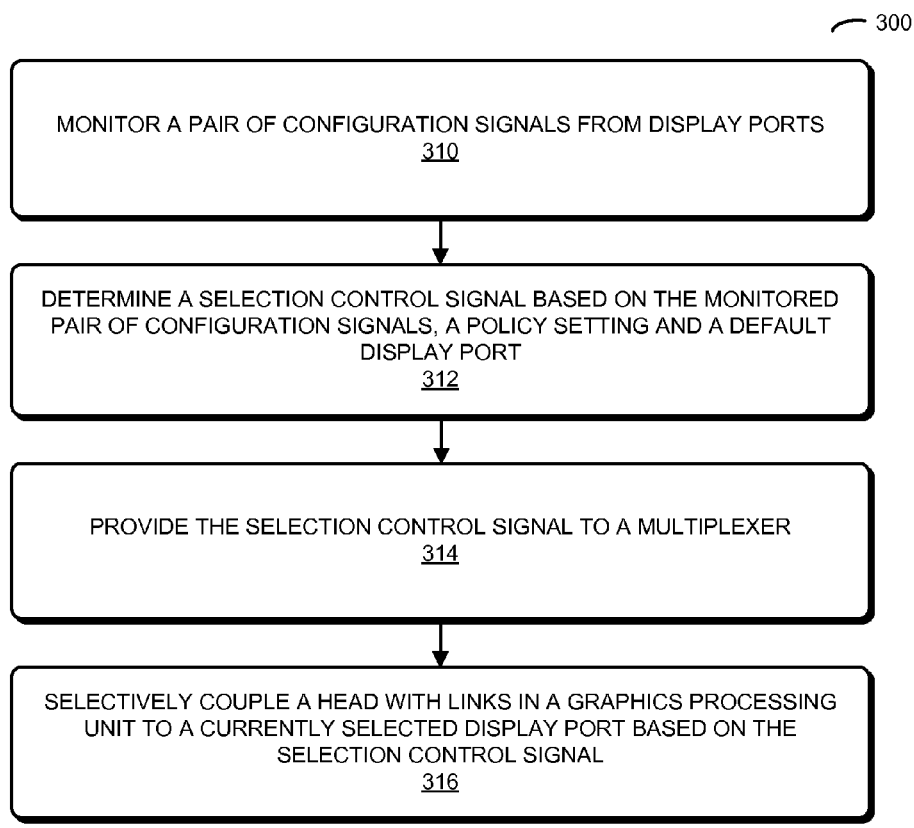
FIG. 3 is a flowchart illustrating a method for selectively coupling a head with links in a graphics processing unit to a currently selected display port in a pair of display ports in the electronic device of FIG. 1 or 2 in accordance with an embodiment of the present disclosure.

We now describe embodiments of the method. FIG. 3 presents a flowchart illustrating a method 300 for selectively coupling a head with links in a graphics processing unit to a currently selected display port in display ports in an electronic device, such as electronic device 100 (FIG. 1) or 200 (FIG. 2). During operation, control logic in the electronic device monitors the pair of configuration signals from the display ports (operation 310), where the pair of configuration signals correspond to physical connections to the display ports. Then, the control logic determines the selection control signal based on the monitored pair of configuration signals, the policy setting and the default display port (operation 312), where the selection control signal specifies the currently selected display port in the display ports. Moreover, the control logic provides the selection control signal to the multiplexer in the electronic device (operation 314). Next, the multiplexer selectively couples the head with the links in the graphics processing unit to the currently selected display port based on the selection control signal (operation 316).

In some embodiments of method 300, there may be additional or fewer operations. Moreover, the order of the operations may be changed, and/or two or more operations may be combined into a single operation.

Figure 4:
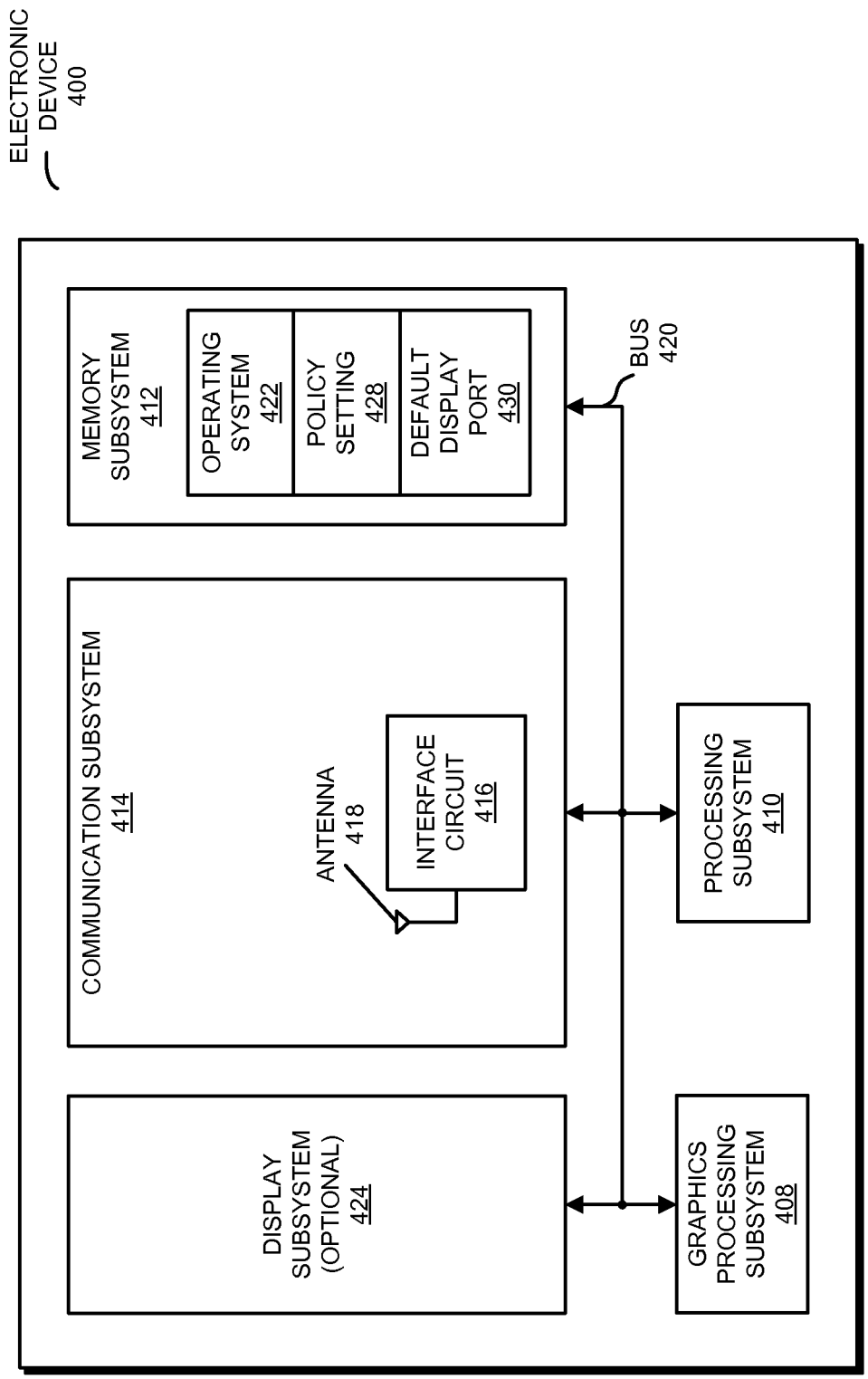
FIG. 4 is a block diagram illustrating the electronic device of FIG. 1 or 2 in accordance with an embodiment of the present disclosure.

FIG. 4 presents a block diagram illustrating an electronic device 400, such as electronic device 100 (FIG. 1) or 200 (FIG. 2). This electronic device includes processing subsystem 410, memory subsystem 412, communication subsystem 414, graphics processing subsystem 408 (which may include graphics processing unit 110, multiplexer 118, control logic 126 and display ports 120 in FIG. 1). Processing subsystem 410 includes one or more devices configured to perform computational operations. For example, processing subsystem 410 can include one or more microprocessors, ASICs, microcontrollers, programmable-logic devices, and/or one or more digital signal processors (DSPs).

Memory subsystem 412 includes one or more devices for storing data and/or instructions for processing subsystem 410 and communication subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as operating system 422), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured, to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Communication subsystem 414 includes one or more devices configured to couple to and communicate on a wired and/or wireless network (i.e., to perform network operations), including: an interface circuit 416 and an optional antenna 418. For example, communication subsystem 414 can include a Bluetooth™ networking system, a cellular networking system (e.g., a 3G/4G network such as UMTS, LTE, etc.), a Universal Serial Bus (USB) networking system, a networking system based on the standards described in IEEE 802.11 (e.g., a Wi-Fi networking system), an Ethernet networking system, and/or another networking system.

Communication subsystem 414 can include processors, controllers, radios/antennas, sockets/plugs, and/or other devices used for coupling to, communicating on, and handling data and events for each supported networking system. Moreover, in some embodiments a 'network' between the electronic devices does not yet exist. Therefore, electronic device 400 may use the mechanisms in communication subsystem 414 for performing simple wireless communication between the electronic devices, e.g., transmitting advertising frames and/or scanning for advertising frames transmitted by other electronic devices.

Within electronic device 400, processing subsystem 410, memory subsystem 412, communication subsystem 414 and graphics processing subsystem 408 are coupled together using bus 420. Bus 420 may include an electrical, optical, and/or electro-optical connection that the subsystems can use to communicate commands and data among one another. Although only one bus 420 is shown for clarity, different embodiments can include a different number or configuration of electrical, optical, and/or electro-optical connections between the subsystems.

Furthermore, in the preceding embodiments, components are shown directly connected to one another or are shown connected via intermediate components. In each instance the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, the electronic device includes an optional display subsystem 424 for displaying information on a display, which may include a display driver and the display, such as a liquid-crystal display, a touchscreen, etc.

As described previously, multiplexing of a single head in graphic processing unit 110 (FIG. 1) in graphics processing subsystem 408 to multiple display ports may be implemented without using firmware or a software driver. Therefore, this multiplexing technique may be compatible with different operating systems (such as operating system 422) that can execute on electronic device 400. Furthermore, in some embodiments, software (such as operating system 422) can optionally set policy setting 128 and default display port 130.

Electronic device 400 can be a single electronic device or functions of electronic device 400 may be implemented in multiple electronic devices (i.e., a system) at one or more locations. For example, electronic device 400 can be (or can be included in): a desktop computer, a laptop computer, a server, a media player (such as an MP3 player), an appliance, a peripheral device (such as a trackpad, a touchscreen, a display, a mouse, a camera, a keyboard, a user-interface device, etc.), a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 400, in alternative embodiments, different components and/or subsystems may be present in electronic device 400. For example, electronic device 400 may include one or more additional graphics processing subsystem, processing subsystems, memory subsystems, communication subsystems, and/or optional display subsystems. Additionally, one or more of the subsystems may not be present in electronic device 400. Moreover, in some embodiments, electronic device 400 may include one or more additional subsystems that are not shown in FIG. 4. For example, electronic device 400 can include, but is not limited to, a data collection subsystem, an audio and/or video subsystem, an alarm subsystem, a media processing subsystem, and/or an input/output (I/O) subsystem. Also, although separate subsystems are shown in FIG. 4, in some embodiments, some or all of a given subsystem or component can be integrated into one or more of the other subsystems or component(s) in electronic device 400. For example, the DP and DDC multiplexers in FIG. 2 may be combined into a single multiplexer chip (such as multiplexer 118 in FIG. 1).

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

While some of the operations in the preceding embodiments were implemented in hardware, in general the operations in the preceding embodiments can be implemented in a wide variety of configurations and architectures. Therefore, some or all of the operations in the preceding embodiments may be performed in hardware, in software or both.

Note that an output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

While the preceding discussion of FIG. 2 used an HDMI display port and an mDP display port as illustrative example, the multiplexing technique may be used to allow a single head in a graphics processing unit to be shared with display ports that are compatible with a wide variety of audio/video interface formats. Furthermore, more than two display ports may be shared. As a consequence, the combinatorial logic in the control logic in the electronic device may be suitably extended as is known to one of skill in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic-device, comprising:
   a graphics processing unit having a head with links configured to communicate video signals, audio signals, data signals and a configuration signal corresponding to a physical connection to a currently selected display port in a pair of display ports;
   a multiplexer electrically coupled to the graphics processing unit, control logic and the pair of display ports, configured to selectively couple the links in the head to the currently selected display port based on a selection control signal that specifies the currently selected display port, wherein the selectively coupling of the links in the head to the currently selected display port is compatible with different operating systems that can execute on the electronic device;
   the pair of display ports, electrically coupled to the multiplexer and the control logic, configured to couple to displays and to communicate the video, the audio and a pair of configuration signals corresponding to physical connections to the pair of display ports, wherein the pair of configuration signals includes the configuration signal; and the control logic, electrically coupled to the pair of display ports and the multiplexer, configured to monitor the pair of configuration signals and to provide the selection control signal to the multiplexer based on the monitored pair of configuration signals, a policy setting and a default display port.

2. The electronic device of claim 1, wherein the multiplexer breaks the selective coupling to a previously selected display port before making the selective coupling to the currently selected display port.

3. The electronic device of claim 2, wherein the control logic is further configured to provide an enable signal to the multiplexer; and wherein the multiplexer is configured to break the selective coupling to the previously selected display port before making the selective coupling to the currently selected display port based on the enable signal.

4. The electronic device of claim 3, wherein the enable signal has a programmable duration.

5. The electronic device of claim 1, wherein, when changing the selective coupling, the multiplexer decouples the graphics processing unit from the pair of display ports for a time duration so that software executing on the electronic device detects a change in the configuration signal.

6. The electronic device of claim 1, wherein the multiplexer includes an analog multiplexer.

7. The electronic device of claim 1, wherein the pair of configuration signals includes hot-plug detect signals associated with the pair of display ports; and wherein a given hot-plug detect signal is asserted when a display is physically connected to a given one of the pair of display ports.

8. The electronic device of claim 1, wherein the control logic includes a filter configured to filter transient signals in the pair of configuration signals.

9. The electronic device of claim 1, wherein policy setting includes one of: first-come, first-serve servicing; and priority-based servicing.

10. The electronic device of claim 1, wherein the default display port includes one of the pair of display ports.

11. The electronic device of claim 1, wherein the electronic device selectively couples the links in the head to the currently selected display port without using a software driver.

12. The electronic device of claim 1, wherein the control logic determines the selection control signal using combinatorial logic.

13. The electronic device of claim 1, wherein the control logic is other than a processor.

14. The electronic device of claim 1, wherein the pair of display ports include physical connectors; and wherein a given display port only includes a predefined number of pins associated with a particular audio/video interface format.

15. The electronic device of claim 1, wherein the policy setting and the default display port are specified by a hardware component electrically coupled to the control logic.

16. The electronic device of claim 1, wherein software executing on the electronic device specified the policy setting and the default display port.

17. A system, comprising:
a graphics processing unit having a head with links configured to communicate video signals, audio signals, data signals and a configuration signal corresponding to a physical connection to a currently selected display port in a pair of display ports;

a multiplexer electrically coupled to the graphics processing unit, control logic and the pair of display ports, configured to selectively couple the links in the head to the currently selected display port based on a selection control signal that specifies the currently selected display port, wherein the selectively coupling of the links in the head to the currently selected display port is compatible with different operating systems that can execute on the system;

the pair of display ports, electrically coupled to the multiplexer and the control logic, configured to couple to displays and to communicate the video, the audio and a pair of configuration signals corresponding to physical connections to the pair of display ports, wherein the pair of configuration signals includes the configuration signal; and the control logic, electrically coupled to the pair of display ports and the multiplexer, configured to monitor the pair of configuration signals and to provide the selection control signal to the multiplexer based on the monitored pair of configuration signals, a policy setting and a default display port.

18. An electronic device-implemented method for selectively coupling a head with links in a graphics processing unit in an electronic device to a currently selected display port in a pair of display ports, wherein the method comprises:

using control logic in the electronic device, monitoring a pair of configuration signals from the pair of display ports, wherein the pair of configuration signals correspond to physical connections to the pair of display ports;

using the control logic, determining a selection control signal based on the monitored pair of configuration signals, a policy setting and a default display port, wherein the selection control signal specifies the currently selected display port;

providing the selection control signal to a multiplexer in the electronic device; and selectively coupling the head with the links in the graphics processing unit to the currently selected display port based on the selection control signal, wherein the selectively coupling of the links in the head to the currently selected display port is compatible with different operating systems that can execute on the electronic device.

19. The method of claim 18, wherein, when changing the selective coupling, the multiplexer decouples the graphics processing unit from the pair of display ports for a time duration so that software executing on the electronic device detects a change in one of the pair of configuration signals.

20. The method of claim 18, wherein the pair of configuration signals include hot-plug detect signals associated with the pair of display ports; and wherein a given hot-plug detect signal is asserted when a display is physically connected to a given one of the pair of display ports.

21. The method of claim 18, wherein the electronic device selectively couples the links in the head in the graphics processing unit to the currently selected display port without using a software driver.

* * * * *